United States Patent
Davies et al.

(10) Patent No.: US 9,692,946 B2
(45) Date of Patent: Jun. 27, 2017

(54) SYSTEM AND METHOD FOR BACKLIGHT AND LCD ADJUSTMENT

(75) Inventors: Trevor Davies, Walnut Creek, CA (US); Giorgio Giaretta, Mountain View, CA (US); Saagar Patel, Oakland, CA (US); Jared Smith, San Francisco, CA (US); Chun Chi Wan, RIchmond (CA); Christopher Orlick, Washington Crossing, PA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1030 days.

(21) Appl. No.: 12/824,457

(22) Filed: Jun. 28, 2010

(65) Prior Publication Data

US 2010/0328537 A1    Dec. 30, 2010

Related U.S. Application Data (60) Provisional application No. 61/221,423, filed on Jun. 29, 2009, provisional application No. 61/287,564, filed on Dec. 17, 2009.

(51) Int. Cl.
*H04N 5/202* (2006.01)
*G09G 3/34* (2006.01)
*G09G 3/36* (2006.01)

(52) U.S. Cl.
CPC ............ *H04N 5/202* (2013.01); *G09G 3/3426* (2013.01); *G09G 3/3648* (2013.01); *G09G 2320/0261* (2013.01); *G09G 2320/0276* (2013.01); *G09G 2320/0646* (2013.01); *G09G 2320/0673* (2013.01)

(58) Field of Classification Search
CPC ............. G09G 3/3426; G09G 2310/00; G09G 2320/0238; G09G 2320/0276; G09G 2320/0673; G09G 3/3648; G09G 2320/0261; G09G 2320/0646; H04N 5/202
USPC ...................... 345/102, 88, 89, 690
See application file for complete search history.

(56) References Cited

U.S. PATENT DOCUMENTS

| | | | | |
|---|---|---|---|---|
| 4,945,351 | A * | 7/1990 | Naiman | 345/589 |
| 5,889,372 | A * | 3/1999 | Beeteson et al. | 315/169.1 |
| 6,553,566 | B1 * | 4/2003 | Grant et al. | 725/28 |
| 7,154,468 | B2 * | 12/2006 | Linzmeier et al. | 345/102 |

(Continued)

FOREIGN PATENT DOCUMENTS

| | | |
|---|---|---|
| DE | 102007044476 A1 * | 3/2009 |
| WO | 02/069030 | 9/2002 |

(Continued)

OTHER PUBLICATIONS

Cristaldi et al, "Liquid Crystal Display Drivers: Techniques and Circuits", excerpt from chapter 4, Springer Science+Business Media B.V. (Apr. 8, 2009), p. 125-128.*

(Continued)

*Primary Examiner* — Julie Anne Watko (57) ABSTRACT

In one embodiment the present invention includes a display system for displaying video. The display system includes a backlight layer and an LCD layer. The display system controls the backlight layer and the LCD layer to emulate a cathode ray tube response. This emulation may be accomplished by applying a gamma function to a gamma corrected input signal. In this manner, the effects resulting from the "crushed blacks" phenomenon may be reduced.

18 Claims, 3 Drawing Sheets

(56) References Cited

U.S. PATENT DOCUMENTS

| | | | |
|---|---|---|---|
| 7,176,878 B2* | 2/2007 | Lew et al. | 345/102 |
| 8,044,922 B1* | 10/2011 | Lew et al. | 345/102 |
| 8,199,100 B1* | 6/2012 | Barnhoefer | G09G 3/3426 345/100 |
| 8,289,270 B2* | 10/2012 | Wallener | H05B 33/0851 345/102 |
| 8,649,440 B2* | 2/2014 | Huynh-Thu et al. | 375/240.25 |
| 9,237,620 B1* | 1/2016 | Knapp | H05B 33/0815 |
| 2004/0113906 A1* | 6/2004 | Lew et al. | 345/211 |
| 2005/0110740 A1* | 5/2005 | Linzmeier et al. | 345/102 |
| 2005/0248592 A1* | 11/2005 | Feng et al. | 345/690 |
| 2006/0101293 A1* | 5/2006 | Chandley et al. | 713/300 |
| 2006/0103621 A1* | 5/2006 | Feng | 345/102 |
| 2006/0202945 A1* | 9/2006 | Feng | 345/102 |
| 2007/0013717 A1* | 1/2007 | Kempf | 345/596 |
| 2007/0216311 A1* | 9/2007 | Cernasov et al. | 315/3 |
| 2007/0222801 A1* | 9/2007 | Whitehead | 345/697 |
| 2007/0268240 A1* | 11/2007 | Lee et al. | 345/102 |
| 2007/0268461 A1* | 11/2007 | Whitehead | 353/53 |
| 2008/0030526 A1* | 2/2008 | Brown Elliott et al. | 345/694 |
| 2008/0094424 A1* | 4/2008 | Ebe | G09G 3/3406 345/690 |
| 2008/0165117 A1* | 7/2008 | Jung et al. | 345/102 |
| 2008/0170083 A1* | 7/2008 | Han et al. | 345/589 |
| 2008/0284714 A1* | 11/2008 | Wu | H05B 33/0815 345/102 |
| 2008/0284721 A1* | 11/2008 | Hasegawa | G09G 3/3406 345/102 |
| 2009/0116232 A1* | 5/2009 | Chang | H05B 33/0818 362/231 |
| 2009/0273677 A1* | 11/2009 | Huynh-Thu et al. | 348/180 |
| 2009/0284459 A1* | 11/2009 | Wallener | H05B 33/0851 345/102 |
| 2009/0322733 A1* | 12/2009 | Park | 345/214 |
| 2010/0134521 A1* | 6/2010 | Hente | G09G 3/3426 345/690 |
| 2010/0194792 A1* | 8/2010 | Lanchava | G02F 1/133603 345/691 |
| 2010/0253711 A1* | 10/2010 | Muroi | G02F 1/133603 345/690 |
| 2011/0025730 A1* | 2/2011 | Ajichi | G02B 6/008 345/690 |
| 2011/0046935 A1* | 2/2011 | Sugaya | G06F 19/3437 703/11 |
| 2011/0169721 A1* | 7/2011 | Bauer | G10L 21/0208 345/84 |
| 2012/0075362 A1* | 3/2012 | Ichioka et al. | 345/690 |
| 2012/0281028 A1* | 11/2012 | Orlick | G09G 3/3426 345/690 |
| 2013/0148039 A1* | 6/2013 | Okitsu | G02F 1/133603 348/790 |

FOREIGN PATENT DOCUMENTS

| | | |
|---|---|---|
| WO | 03/077013 | 9/2003 |
| WO | 2006/010244 | 2/2006 |

OTHER PUBLICATIONS

Redefine. "The Girl with the Dragon Tattoo: Dolby PRM-4200 12bit monitor" (http://redefinecamerarentals.com/2012/04/dolby-12bit/) Apr. 18, 2012 (as viewed on Feb. 16, 2017).*

Giles. "Dolby: the ultimate replacement for a CRT monitor?" (http://digitalcolorist.com/2012/04/dolby-the-perfect-crt-monitor-replacement/) Apr. 4, 2012.*

Cinema, Imaging. "Dolby PRM team wins Academy Award for imaging solution" (https://blog.dolby.com/2016/02/dolby-prm-team-wins-academy-award-for-imaging-solution/) Feb. 16, 2016.*

Charles Poynton, A Technical Introduction to Digital Video, Chapter 6 (John Wiley & Sons 1996).

Charles Poynton, Frequently Asked Questions about Gamma (1998).

Dolby Corp., Dolby's High-Dynamic-Range Technologies: Breakthrough TV Viewing, 2008.

* cited by examiner

SYSTEM AND METHOD FOR BACKLIGHT AND LCD ADJUSTMENT

CROSS REFERENCE TO RELATED APPLICATIONS

This application claims priority to U.S. Provisional Patent Application No. 61/221,423 filed 29 Jun. 2009 and 61/287,564 filed 17 Dec. 2009, hereby incorporated by reference in its entirety.

BACKGROUND

The present invention relates to liquid crystal displays, and in particular, to adjusting the display signals in liquid crystal displays.

Unless otherwise indicated herein, the approaches described in this section are not prior art to the claims in this application and are not admitted to be prior art by inclusion in this section.

There are two general markets for video display equipment: the consumer market and the professional market. Professional equipment may be used for activities with higher requirements than consumer equipment, such as for video and film viewing during post-production, editing, broadcasting, etc. A common professional monitor is the model BVM-D24E from Sony Corp., a 24-inch display that costs approximately $25,000. The model BVM-D24E uses a cathode ray tube (CRT).

In recent years, the consumer market has shifted from CRT technology to liquid crystal display (LCD) technology as the cost of LCD equipment has decreased. However, this trend has not penetrated the professional market until recently. For example, Sony Corp. recently discontinued the model BVM-D24E (which has a CRT) and has introduced the model BVM-L230 (which has a LCD), a 22.5-inch display that costs approximately $14,000.

Other companies have also introduced LCD displays in the consumer market. BrightSide Technologies (recently acquired by Dolby Corp.) has developed high dynamic range (HDR) LCD displays. Details of these HDR displays can be found in WO 02/069030 titled "High Dynamic Range Display Devices", WO 03/077013 titled "High Dynamic Range Display Devices", and WO 06/010244 titled "Rapid Image Rendering on Dual-Modulator Displays".

For many LCD displays, power management is an issue. In general, an LCD display includes a backlight layer and an LCD layer. The backlight layer generates light and the LCD layer selectively blocks light. Thus, in an area where the LCDs are blocking light, it is inefficient for the backlight layer to generate more light than is needed. Efficiency of the LCD display may be improved by generating only the necessary amount of light, and no more. One measurement is the average light power, and an average light power of 100% (e.g., a multiplier of 1×) meets the efficiency needs.

SUMMARY

Embodiments of the present invention improve the display of video signals by a LCD device. In general, an embodiment of the present invention implements a transfer function that causes an LCD device to generate an output that more closely resembles the output of a CRT device.

According to an embodiment, an apparatus includes a circuit for generating video signals for a video display device that includes an LCD layer. The circuit includes backlight generation circuit, a transfer function circuit, an LCD correction circuit, an LCD modification circuit, and a controller circuit. The backlight generation circuit generates a backlight control signal based on an input video signal. The transfer function circuit converts the input video signal to a modified input video signal using a transfer function that corresponds to a CRT response. The LCD correction circuit generates an LCD control signal based on the modified input video signal and the backlight control signal. The LCD modification circuit modifies the LCD control signal, using an inverse characterization of the LCD layer, to generate a modified LCD control signal. The controller circuit controls the video display device according to the backlight control signal and the modified LCD control signal to display an output video signal. The backlight control signal and the modified LCD control signal, in combination, control the video display device to emulate the CRT response.

According to an embodiment, the apparatus above may be incorporated into a display device such as a monitor that includes a backlight layer and an LCD layer.

According to an embodiment, a method generates video signals for a video display device that includes a liquid crystal display (LCD) layer. The method includes generating a backlight control signal based on an input video signal. The method further includes converting the input video signal to a modified input video signal using a transfer function that corresponds to a CRT response. The method further includes generating an LCD control signal based on the modified input video signal and the backlight control signal. The method further includes modifying the LCD control signal, using an inverse characterization of the LCD layer, to generate a modified LCD control signal. The method further includes controlling the video display device according to the backlight control signal and the modified LCD control signal to display an output video signal. The backlight control signal and the modified LCD control signal, in combination, control the video display device to emulate the CRT response.

The following detailed description and accompanying drawings provide a better understanding of the nature and advantages of the present invention.

DETAILED DESCRIPTION

Described herein are techniques for adjusting the output of LCD devices. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

Figure 1:
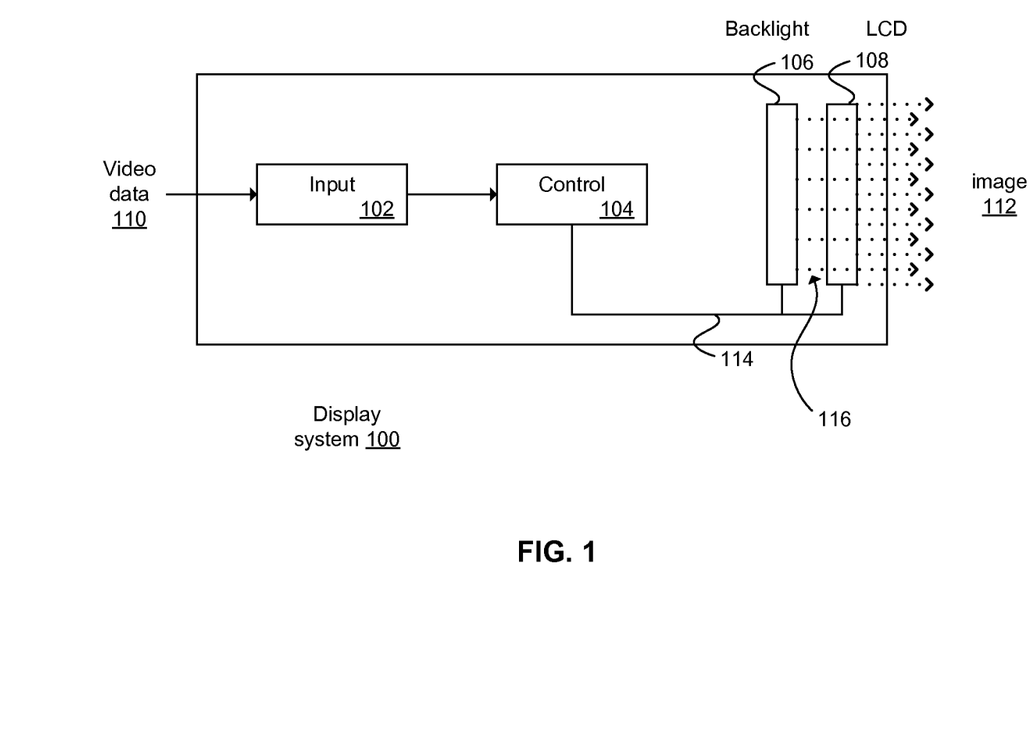
FIG. 1 is a block diagram of a display system 100 according to an embodiment of the present invention.

FIG. 1 is a block diagram of a display system 100 according to an embodiment of the present invention. The display system 100 may be in the form factor of a video monitor, with a width of 40 inches, a height of 30 inches, and a depth of 10 inches. The display system 100 includes an input interface 102, a control circuit 104, a backlight layer 106, and an LCD layer 108. The display system 110 receives input video data 110 and generates output images 112.

The input interface 102 receives the input video data 110. The input interface 102 may implement one or more standard video input interfaces such as dual link HD-SDI (high definition-serial digital interface), DVI-D (digital video interface-digital), etc. The input video data 110 may be in one of various standard video formats such as 1080/60i, 720/50p, SXGA (super eXtended graphics array), WUXGA (widescreen ultra eXtended graphics array), HD-SDI standard definition, single link HD-SDI 720p, single link HD-SDI 1080i/p, dual link HD-SDI, HD-SDI 2 k, 3G HD-SDI (single link), etc. The input interface 102 provides the input video data 110 to the control circuit 104.

The control circuit 104 processes the input video data 110 and generates control signals 114 to control the backlight layer 106 and the LCD layer 108. In general, the control circuit 104 implements a transfer function and applies the transfer function to the input video data 110 to generate the control signals 114. Further details of the control circuit 104 are provided with reference to FIG. 2.

In general, the backlight layer 106 emits light corresponding to a low-resolution image, and the LCD layer 108 (which has a higher resolution) selectively blocks the light. In effect, these two "images" are multiplied optically. As a result, the output HDR image 112 is at a high resolution. The backlight layer 106 and the LCD layer 108 may be implemented as taught by the HDR display details of WO 02/069030 titled "High Dynamic Range Display Devices", WO 03/077013 titled "High Dynamic Range Display Devices", and WO 06/010244 titled "Rapid Image Rendering on Dual-Modulator Displays". The use of two display layers may generally be referred to as "dual modulation".

The backlight layer 106 may be implemented with light emitting diodes (LEDs). The LEDs may be in groups of three (one red, one green and one blue). According to another embodiment, the backlight layer 106 may be implemented with a scanning laser. The backlight layer may also be implemented as another LCD layer, as a backlight projector, etc. In general, the backlight layer 106 has a lower resolution than the LCD layer 108. The control signals 114 control the backlight layer 106 to generate a low resolution image 116 corresponding to the input video data 110 (as modified by the transfer function).

The LCD layer 108 may be implemented with LCD elements. In general, the LCD layer 108 has a higher resolution than the backlight layer 106. The control signals 114 control the LCD layer 108 to selectively block, in high resolution, portions of the low resolution image 116. As a result, the output HDR image 112 is also at high resolution. As a result, the output HDR image 112 corresponds to the input video data 110 (as modified by the transfer function).

As further detailed with reference to FIG. 2, the control circuit 104 uses the transfer function when controlling the backlight layer 106 and the LCD layer 108, in order to generate the HDR image 112 that more closely resembles the output of a CRT device. This operation may be referred to as a CRT emulation mode.

The display system 100 may also include other components (not shown) such as additional input or output interfaces (keyboard, mouse, infrared remote, Internet, universal serial bus, etc.), connectors to external power supplies, internal power systems such as batteries, etc. A full description of these components is omitted for brevity, except where useful to more fully explain aspects of the present invention.

Figure 2:
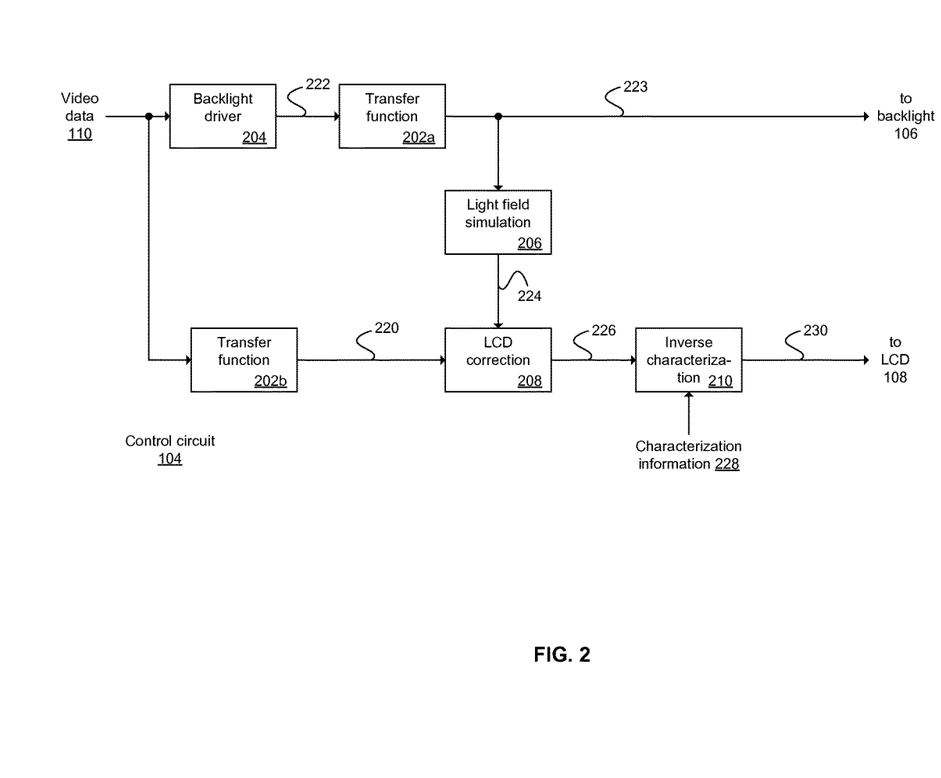
FIG. 2 is a block diagram showing further details of the control circuit 104 (see FIG. 1).

FIG. 2 is a block diagram showing further details of the control circuit 104 (see FIG. 1). The control circuit 104 includes transfer function circuits 202a and 202b (generally labeled 202), a backlight driver circuit 204, a light field simulation circuit 206, a LCD correction circuit 208, and an inverse characterization circuit 210.

The input video data 110 feeds the backlight driver 204. The backlight driver 204 generates drive values for the backlight 106 (e.g., all the LEDs) by taking an average of the gamma-corrected input video data 110 in the area around each LED. As the gamma-corrected video 110 is approximately a perceptual representation of the light level, the LEDs drive signals 222 are generated from the mean perceptual image. That average is multiplied by a factor greater than 1.

There are two reasons for performing the LED generation in the perceptual gamma-corrected domain. The first is that the bit-depth requirements are greatly reduced when we operate in the perceptual domain. The filters and arithmetic processes would require significantly more bits/processing power, and the potential for errors in dark regions would be increased. The second reason relates to the multiplication factor, which give us the desired "centering" of the LCD range around the perceptual signal so that the LCD can express high-resolution detail above and below its average level without clipping.

The transfer function circuit 202a converts these gamma-corrected drive values 222 to the linear domain (223), as the LEDs are typically driven as linear devices using pulse width modulation (PWM). This function is typically implemented as a look-up table.

The light field simulation circuit 206 models the optical cavity between the LEDs and the back of the LCD to simulate the appearance of the backlight 106 based on the drive values of the LEDs. This is typically implemented using a field programmable gate array (FPGA) device, a cell processor or a graphics processor.

The transfer function circuit 202b converts the video data 110 to the linear domain (220) by applying the gamma function that the display system 100 is emulating. This is typically implemented using a look-up table.

The LCD correction circuit 208 performs LCD correction in the linear domain, such that the signals 224 and 226 represent respectively the light emission from the backlight 106 and the transmissivity of the LCD 108. The LCD correction circuit 208 models the optical multiplication of the two and thus from the simulated backlight image (224) calculates the best LCD transmissivity to achieve the target image. This is typically performed in an FPGA, a cell processor or a graphics processor.

The linear representation (226) of the LCD controls the linear transmissivity of the LCD, which involves the inverse characterization circuit 210 inverting the forward transfer function of the LCD 108.

However, even with the inverted response (228) of the LCD, the step size in that function is large at the top and bottom extremes of the LCD range which leads to big steps in that inverted response and therefore non-linearities. To achieve a smooth gamma response, these regions of the LCD response must be avoided and this is achieved by keeping the LCD nominally at 50% which is in turn achieved by driving the LEDs at 2× the mean perceptual light level, as relating to the LED drive signals 222.

The transfer function circuit 202b receives the input video data 110 (see FIG. 1), applies a transfer function to the video data 110, and generates modified video data 220. In general, the transfer function adjusts the input video data 110 such that the output of the display system 100 (see FIG. 1) more closely resembles the output of a CRT device. More specifically, the input video data 110 is typically in a gamma corrected format; the transfer function is the gamma function being emulated; and the modified video data 220 is in a linear format.

According to an embodiment, the transfer function corresponds to a gamma function of a CRT response (e.g., an ideal CRT response). The intensity of light generated by a physical device is usually a non-linear function of the applied signal. A conventional CRT has a power-law response to voltage: intensity produced at the face of the display is (approximately) the applied voltage raised to the γ power. The numerical value of the exponent γ of this power function is colloquially known as "gamma". The gamma γ may differ according to various standards; it is often selected as 2.2, 2.5 or 2.8. According to an embodiment, the gamma is selectable between 2.2 and 3.0.

One reason that the video data 110 is in gamma corrected format is that recording devices assume that the output devices generate their output according to a nonlinear function. As a result, recording devices transform linear-light intensity a nonlinear video signal by gamma correction. This is often done at the camera.

In the absence of the transfer function circuit 202, the output of the display system 100 (see FIG. 1) would more closely correspond to a native LCD response. Unfortunately, at low display levels (e.g., near total black, in the range of 0% to about 1% signal level), the native LCD response deviates significantly from a power function in several respects: a) it does not go through (0,0)—i.e. when the input is 0, the LCD does not block light perfectly; b) the shape is not perceptually uniform—changes to the input at a low level and a high level cause less perceptual difference than in the mid-level. As a result, the phenomenon known as "clipped blacks" or "crushed blacks" occurs: Even though there are two or more discrete input levels, the flatness of the LCD response causes them to appear as only a single level of black. Thus, a result of processing the input video data 110 with the transfer function circuit 202 is to improve the appearance of the image 112 near total black.

According to an embodiment, the transfer function circuit 202 implements an equation that corresponds to the transfer function. $Co=Ci^{gamma}$ when Ci represents gamma-corrected R, G and B signals (also referred to as RGB components) and Co represents linear R, G and B signals. Co is Ci raised to the power gamma where gamma is typically 2.4.

According to an embodiment, the transfer function circuit 202 includes a memory that stores a lookup table. The data stored in the lookup table corresponds to the various possible outputs of the transfer function. The transfer function circuit 202 uses the input video data 110 as an index to the lookup table. Thus, for a given input, the lookup table produces the appropriate output (that corresponds to the output that the transfer function would produce). This is typically implemented as a 1 k to 16 k look up table in FPGA block RAM containing 20-25 bits of data.

According to an embodiment, the gamma response is applied in the R, G, B domain. Content received in Y, Cb, Cr format may be converted to R, G, B prior to applying the display gamma function. According to an embodiment, the gamma of the display response may be verified by calculating the gradient of the least squares best fit of the slope of a log/log plot of measured luminance vs. input code value, for full screen grey-scale image from peak white luminance down to 0.01 nits (candelas per square meter).

The backlight driver circuit 204 receives the video data 110 and generates a backlight control signal 222 according to the video data 110. As discussed above, the transfer function circuit 202a applies a transfer function to the backlight control signal 222 to generate the (linear) backlight control signal 223. As discussed above with reference to FIG. 1, the backlight layer 106 generates a low-resolution image, so the backlight control signal 223 instructs the backlight layer 106 to generate the appropriate low-resolution image. According to an embodiment, the backlight layer 106 includes LEDs, and the backlight control signal 223 is generated using pulse width modulation.

One function of the backlight driver circuit 204 is to generate the backlight control signal 222 having an appropriate average light level. As discussed above, for efficiency, it is desired that the backlight layer not generate too much light, because excess light may be blocked by the LCD layer in order to display an accurate image. Thus, for efficiency the backlight control signal would, in the absence of other considerations, be generated to have 100% of the average light level. Light levels above 100% are inefficient because they may be blocked by the LCD layer.

In contrast, one feature of an embodiment of the present invention is that the backlight driver circuit generates the backlight control signal 222 to control the backlight 106 to generate more than 100% of the average light level. This may be due to the effect of the transfer function and its modification of the input video data 110. More specifically, it has been found that the backlight control signal 222 should control the backlight 106 to generate more than 100% of the average light level. Note that this goes against the conventional efficiency concerns. Typically the range 150% to 250% works well. In addition, the range 180% to 220% may be used.

The light field simulation circuit 206 receives the backlight control signal 222, simulates the light field to be displayed, and generates light field information 224. The light field simulation corresponds to the low-resolution image to be displayed by the backlight layer 106. The light field simulation circuit 206 may be implemented with an FPGA, a cell processor, or a graphics processing unit (GPU).

The inverse characterization circuit 210 receives the LCD control signal 226 and characterization information 228, applies an inverse characterization to the LCD control signal 226 based on the characterization information 228, and generates a modified LCD control signal 230. The characterization information 228 corresponds to an inverse characterization of the LCD layer 108. More specifically, the LCD layer 108 assumes that its input is a gamma-corrected control signal. The characterization information 228 corresponds to the specific response for the specific LCD layer 108. This specific response information may be measured when the LCD layer 108 is selected for assembly into the display system 100. One way of measuring the response is for each color (red, green and blue), to input monotonic code words to control the LCD layer 108, to measure the resulting light using a spectroradiometer, and to determine the corresponding gamma value for each reading. These gamma values may then be used as the characterization information, which the inverse characterization circuit 210 uses to convert the (linear) LCD control signal 226 into the (gamma corrected) modified LCD control signal 230.

According to an embodiment, the inverse characterization circuit 210 may generate the modified LCD control signal 230 in low voltage differential signaling (LVDS) format for use by the LCD layer 108. According to other embodiments, the inverse characterization circuit 210 may generate the modified LCD control signal 230 in other formats according to the appropriate input for the LCD layer 108.

Although the above description has focused on the features of the display system 100 as related to CRT emulation, note that the display system 100 may display video data in other formats. For example, the display system 100 may emulate various types of consumer LCDs so that professional editors can see how the content would look to consumers. A full description of these other formats is omitted for brevity.

Figure 3:
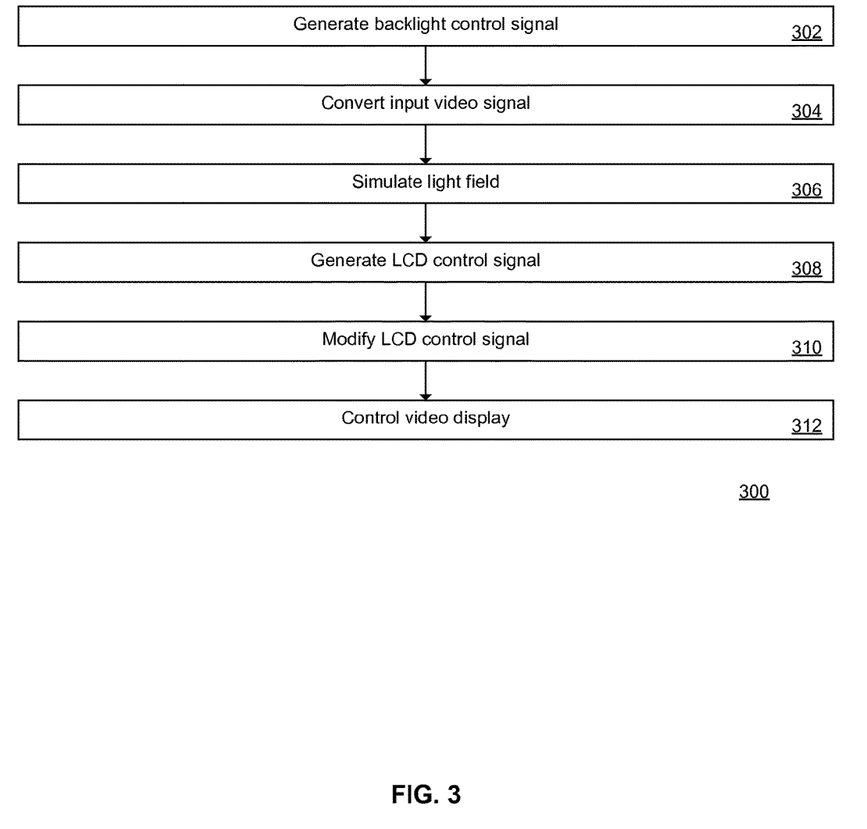
FIG. 3 is a flow diagram of a method 300 of generating video signals for a video display device, such as the display device 100, that includes a LCD layer.

FIG. 3 is a flow diagram of a method 300 of generating video signals for a video display device, such as the display device 100, that includes a LCD layer, such as the LCD layer 108. The method 300 may be performed, at least in part, by a device such as the display device 100 (see FIG. 1) or by a component of the display device 100 (e.g., the control circuit 104).

In step 302, a backlight control signal is generated based on the input video signal. The backlight driver circuit 204 (see FIG. 2) may perform step 302. The backlight control signal may adjust the average light level to 200% (e.g., increase to double or increase by 100%) for improved performance in accordance with the transfer function having been applied to the input video signal. The backlight control signal may be used to control a backlight layer such that the backlight layer displays a low resolution image that corresponds to the input video data. The backlight control signal may be a PWM signal that drives LEDs that make up the backlight layer.

In step 304, an input video signal is converted to a modified input video signal using a transfer function. The transfer function may correspond to a CRT response. More specifically, the transfer function may be a gamma function. The transfer function may convert a power law signal to a linear signal. The transfer function circuit 202 (see FIG. 2) may perform step 304.

In step 306, a light field of the backlight layer is simulated based on the backlight control signal. The light field information resulting from this simulation indicates the low-resolution image that the backlight control signal is controlling the backlight layer to generate. The light field simulation circuit 206 (see FIG. 2) may perform step 306.

In step 308, a LCD control signal is generated based on the modified input video signal and the backlight control signal (e.g., the light field information). The LCD control signal may be used to control the LCD layer. The LCD correction circuit 208 may perform step 308.

In step 310, the LCD control signal is modified, using an inverse characterization of the LCD layer, to generate a modified LCD control signal. The inverse characterization circuit 210 (see FIG. 2) may perform step 310.

In step 312, the video display device is controlled according to the backlight control signal and the modified LCD control signal to display an output video signal. The backlight control signal and the modified LCD control signal, in combination, control the video display device to emulate the CRT response. The control circuit 104 (see FIG. 1) may perform step 312.

Further Implementation Details

The invention may be implemented in hardware, executable modules stored on a computer readable medium, or a combination of both (e.g., programmable logic arrays). Unless otherwise specified, the steps included as part of the invention need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus for reproducing the response of an emulated device including a circuit for generating video signals for a video display device that includes a liquid crystal display (LCD) layer and a backlight, said backlight comprising a set of light emitting diodes (LEDs) wherein each LED is configured to be individually modulated, the circuit comprising:

a backlight generation circuit that generates a backlight control signal based on an input video signal, said input video data comprising a non-linear signal produced by gamma correcting recorded linear light image data, the backlight control signal comprising an average of the gamma corrected input video signal in the area around each LED;

a backlight transfer function circuit that transforms the backlight control signal to a linear backlight control signal to drive each individual LED using pulse width modulation (PWM) signal calculated for each individual LED and further such that the backlight generates a low resolution image of the input video signal;

a emulated device gamma response function circuit that converts the input video signal to a modified input video signal using a transfer function that corresponds to a emulated device response;

a LCD correction circuit that generates a linear LCD transmissivity signal based on the modified input video signal and the light field simulation signal;

a LCD modification circuit that modifies the linear LCD transmissivity signal, applying an inverse characterization of the LCD layer to generate the LCD control signal; and wherein the video display device according to the backlight control signal and the LCD control signal reproduces the response of the emulated device.

2. The apparatus of claim 1, further comprising:

a light field simulation circuit, coupled between the backlight generation circuit and the LCD correction circuit, that simulates a light field of the LCD layer according to light field simulation signal.

3. The apparatus of claim 1, wherein the emulated device gamma response function circuit implements a gamma function, wherein the gamma function operates on RGB components, and wherein the modified input video signal comprises a linear R, G, B signal.

4. The apparatus of claim 1, wherein the transfer function circuit implements a gamma function with a factor of between 2.2 and 3.0.

5. The apparatus of claim 1, wherein the transfer function circuit implements a gamma function with a factor that is selectable between 2.2 and 3.0.

6. The apparatus of claim 1, wherein the backlight generation circuit generates the backlight control signal to have a mean perceptual light level increased by a factor greater than 1.

7. The apparatus of claim 1, wherein the backlight generation circuit generates the backlight control signal to have a mean perceptual light level increased between 180% and 220%.

8. The apparatus of claim 1, wherein the backlight generation circuit generates the backlight control signal to have a mean perceptual light level increased between 150% and 250%.

9. A system for reproducing the response of an emulated device, comprising:

a backlight layer, said backlight layer comprising a set of light emitting diodes (LEDs) wherein each LED is configured to be individually modulated;

a liquid crystal display (LCD) layer; and a dual control circuit that generates video signals for the backlight layer and the LCD layer, the dual control circuit including:

a backlight generation circuit that generates a backlight control signal based on an input video signal, said input video data comprising a non-linear signal produced by gamma correcting recorded linear light image data, the backlight control signal comprising an average of the gamma corrected input video signal in the area around each LED;

a backlight transfer function circuit that transforms the backlight control signal to a linear backlight control signal to drive each individual LED using pulse width modulation (PWM) signal calculated for each individual LED and further such that the backlight generates a low resolution image of the input video signal;

a emulated device gamma response function circuit that converts the input video signal to a modified input video signal using a transfer function that corresponds to a emulated device response;

a LCD correction circuit that generates a LCD control signal based on the modified input video signal and the light field simulation signal that generates the low resolution image wherein further the generated LCD control signal is a corrected signal in the linear domain based upon a function of the transmissivity of the LCD and the backlight illumination;

a LCD modification circuit that modifies the LCD control signal, using an inverse characterization of the LCD layer inputting the linearized LCD control signal, to generate a modified LCD control signal; and a controller circuit that controls the backlight layer according to the backlight control signal and that controls the LCD layer according to the modified LCD control signal to display an output video signal, wherein the linear backlight control signal and the modified LCD control signal, in combination, control the backlight layer and the LCD layer to emulate the emulated device response.

10. A method of generating video signals for a video display device that reproduces the response of an emulated device that includes a liquid crystal display (LCD) layer and a backlight, said backlight comprising a set of light emitting diodes (LEDs) wherein each LED is configured to be individually modulated, comprising:

generating a backlight control signal based on an input video signal, said input video data comprising a non-linear signal produced by gamma correcting recorded linear light image data, the backlight control signal comprising an average of the gamma corrected input video signal in the area around each LED;

transforming the backlight control signal to a linear backlight control signal to drive each individual LED using pulse width modulation (PWM) signal calculated for each individual LED such that the backlight generates a low resolution image of the input video signal;

converting the input video signal to a modified input video signal using a transfer function that corresponds to a emulated device response;

generating a LCD control signal based on the modified input video signal and the light field simulation signal that generates the low resolution image wherein further the generated LCD control signal is a corrected signal in the linear domain based upon a function of the transmissivity of the LCD and the backlight illumination;

modifying the LCD control signal, using an inverse characterization of the LCD layer inputting the linearized LCD control signal; and controlling the video display device according to the backlight control signal and the modified LCD control signal reproduces the response of the emulated device response.

11. The method of claim 10, wherein the input video signal comprises an input gamma corrected video signal, further comprising:

converting the input gamma corrected video signal, using a gamma function operating on RGB components, to generate the modified input video signal, wherein the modified input video signal comprises a linear R, G, B signal.

12. The method of claim 10, wherein generating the backlight control signal includes:
   calculating an average signal level of the input video signal; and
   generating the backlight control signal based on the average signal level.

13. The method of claim 10, wherein generating the backlight control signal includes:
   increasing a mean perceptual light level of the backlight control signal by a factor.

14. The method of claim 10, wherein generating the backlight control signal includes:
   increasing a mean perceptual light level of the backlight control signal by a factor of between 1.8 and 2.2.

15. The method of claim 10, wherein generating the backlight control signal includes:
   increasing a mean perceptual light level of the backlight control signal by a factor of between 1.5 and 2.5.

16. The method of claim 10, wherein the transfer function is a gamma function.

17. The method of claim 10, wherein the transfer function is a gamma function calculated using an equation comprising $Co=Ci^{gamma}$ when Ci represents gamma-corrected R, G, and B signals and wherein gamma is approximately 2.4.

18. The method of claim 10, wherein the transfer function is a gamma function calculated using a lookup table.

* * * * *